United States Patent
Tadepalli et al.

(10) Patent No.: US 7,054,103 B2
(45) Date of Patent: May 30, 2006

(54) DOWNSTREAM FINNED STRIPPER SHROUD AIRSTREAM CONDITIONING APPARATUS FOR A DISC DRIVE

(75) Inventors: Srinivas Tadepalli, Eden Prairie, MN (US); Cory Burt Welscher, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 185 days.

(21) Appl. No.: 09/894,668

(22) Filed: Jun. 27, 2001

(65) Prior Publication Data

US 2002/0015255 A1 Feb. 7, 2002

Related U.S. Application Data

(60) Provisional application No. 60/220,722, filed on Jul. 26, 2000.

(51) Int. Cl.
*G11B 33/14* (2006.01)
*G11B 25/04* (2006.01)

(52) U.S. Cl. .................. 360/97.02; 360/97.03
(58) Field of Classification Search ........... 360/97.02, 360/97.03
See application file for complete search history.

(56) References Cited

U.S. PATENT DOCUMENTS

| 4,647,997 | A |   | 3/1987  | Westwood |          |
|-----------|---|---|---------|----------|----------|
| 4,703,379 | A |   | 10/1987 | Bogdanski |         |
| 4,821,130 | A |   | 4/1989  | Bernett et al. |    |
| 5,134,530 | A |   | 7/1992  | Hall |              |
| 5,140,578 | A |   | 8/1992  | Tohkairin |         |
| 5,212,679 | A |   | 5/1993  | Tohkairin |         |
| 5,631,787 | A |   | 5/1997  | Huang et al. |      |
| 5,636,082 | A |   | 6/1997  | Shibuya et al. |    |
| 5,654,847 | A | * | 8/1997  | Yagi et al. ............... 360/97.02 |
| 5,696,649 | A |   | 12/1997 | Boutaghou |         |
| 5,898,545 | A |   | 4/1999  | Schirle |           |
| 5,956,203 | A |   | 9/1999  | Schirle et al. |    |
| 6,091,570 | A |   | 7/2000  | Hendriks |          |
| 6,125,003 | A |   | 9/2000  | Tsuda et al. |      |
| 6,449,119 | B1 | * | 9/2002 | Hashizume et al. ...... 360/97.03 |
| 6,462,901 | B1 | * | 10/2002 | Tadepalli ................. 360/97.03 |
| 6,487,038 | B1 | * | 11/2002 | Izumi et al. ............. 360/97.02 |
| 2002/0008934 | A1 | * | 1/2002 | Tadepalli et al. ........ 360/97.02 |
| 2002/0075591 | A1 | * | 6/2002 | Chang et al. ............ 360/97.02 |

FOREIGN PATENT DOCUMENTS

EP 0 450 184 A2 10/1991
JP 07320478 A * 12/1995

* cited by examiner

*Primary Examiner*—Craig A. Renner
(74) *Attorney, Agent, or Firm*—Fellers, Snider, et al.

(57) ABSTRACT

An airstream conditioning apparatus for a data storage device employing a spinning data storage disc and an actuator operatively interfacing in a data reading and writing relationship. The apparatus comprises an airstream stripper downstream of the actuator with respect to the direction of air currents generated by the spinning discs. The airstream stripper comprises a vane extending substantially radially from an outer radial portion to an inner radial portion of the data storage disc and adjacent the data storage surface. The vane is disposed substantially transverse to the actuator distal end along the radial path of actuator travel across the data disc.

14 Claims, 12 Drawing Sheets

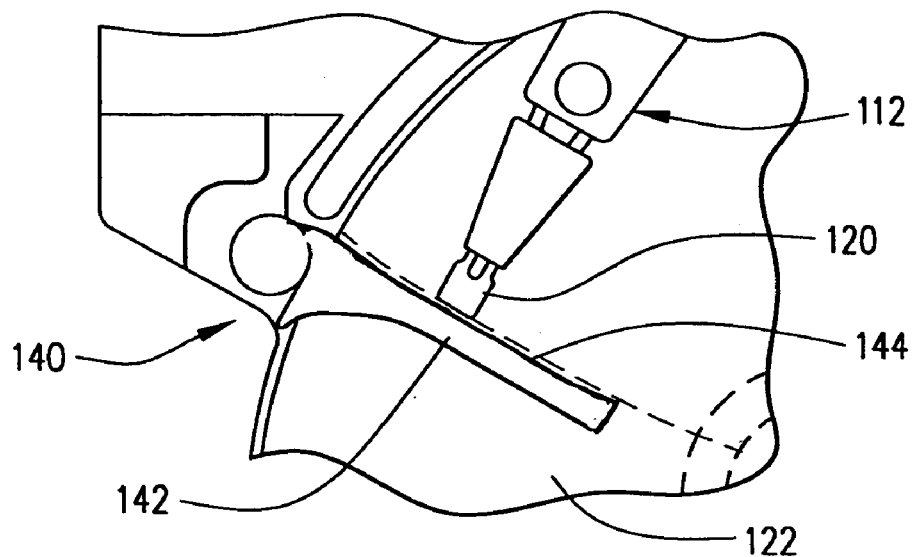
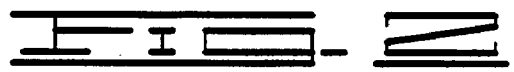
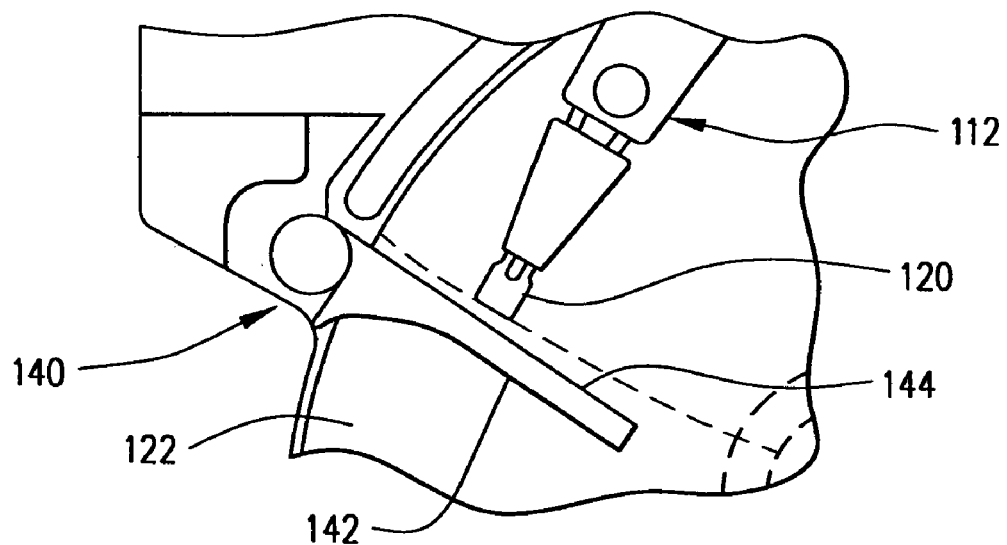
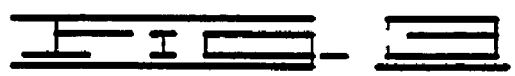

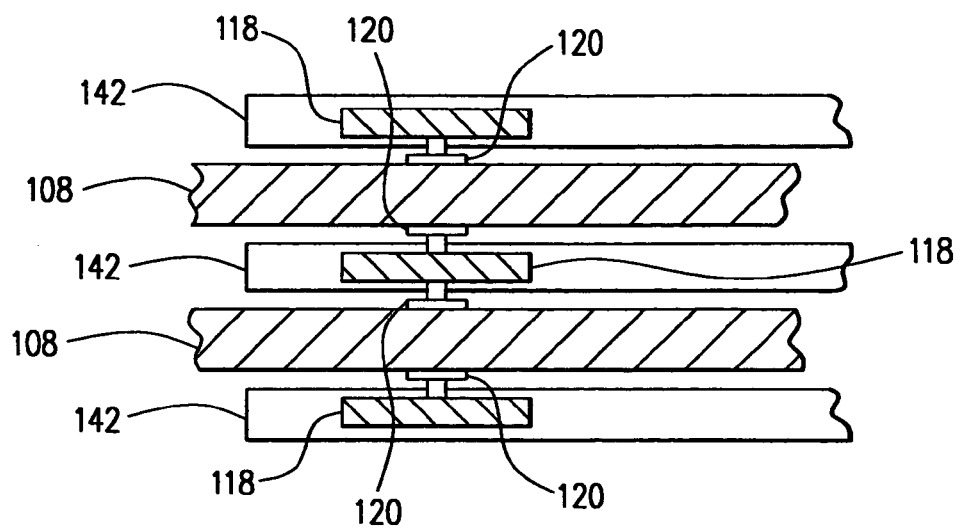
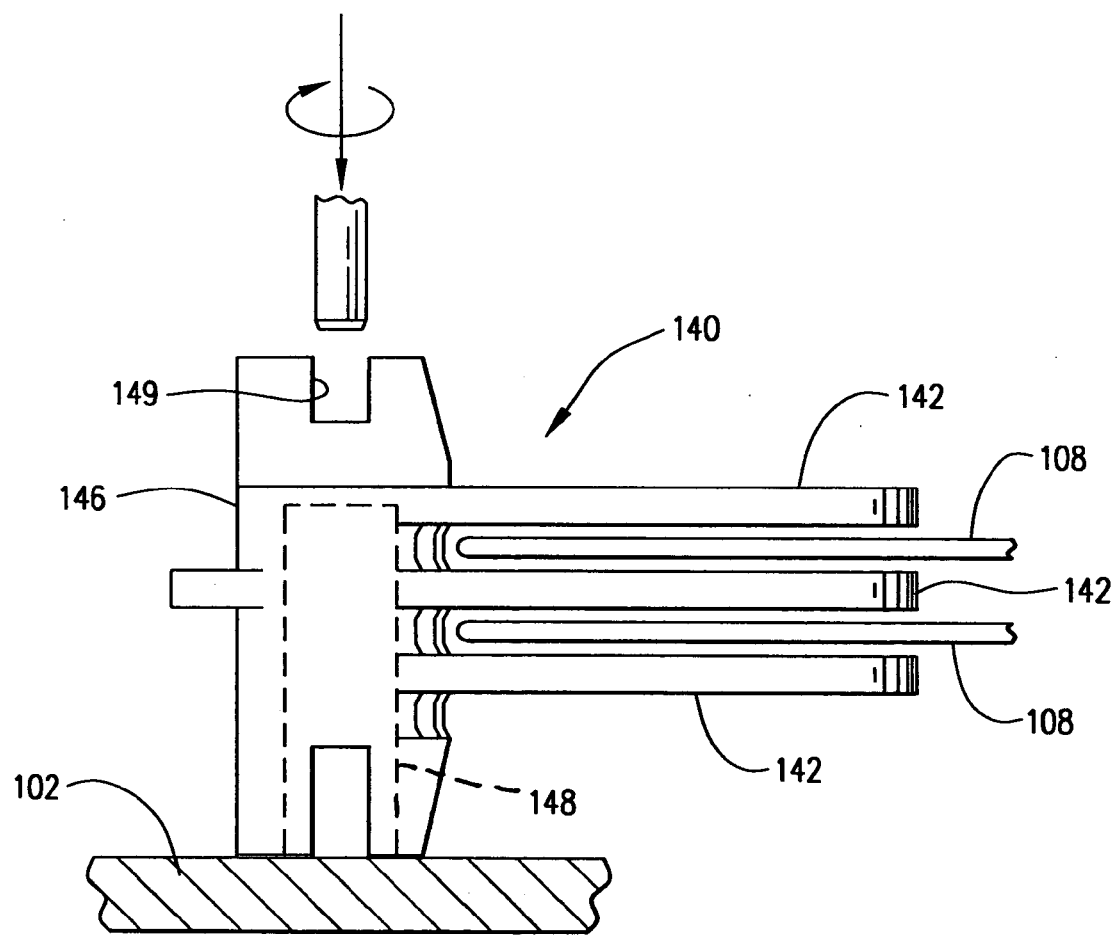
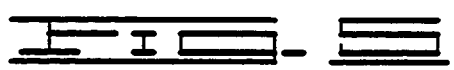

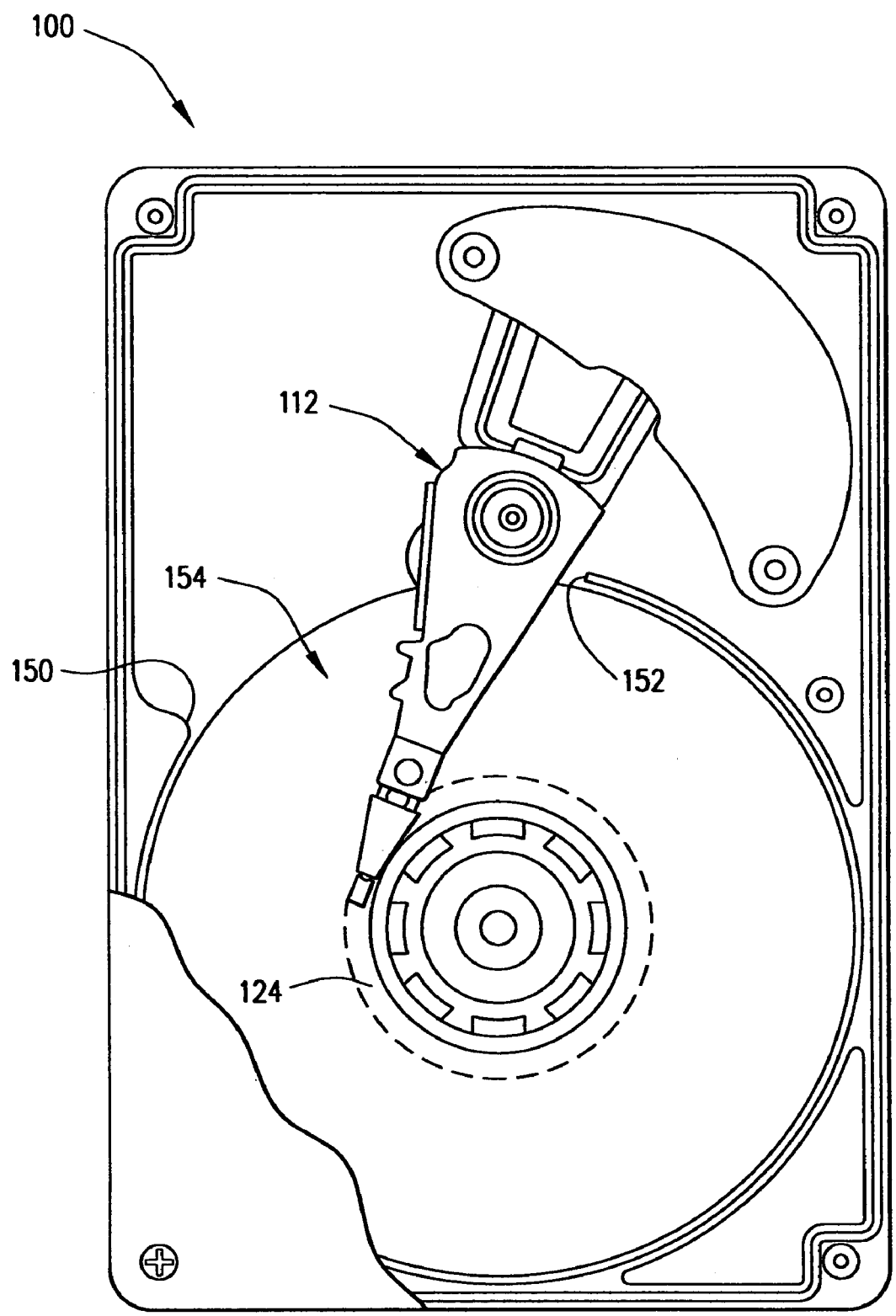
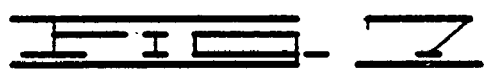

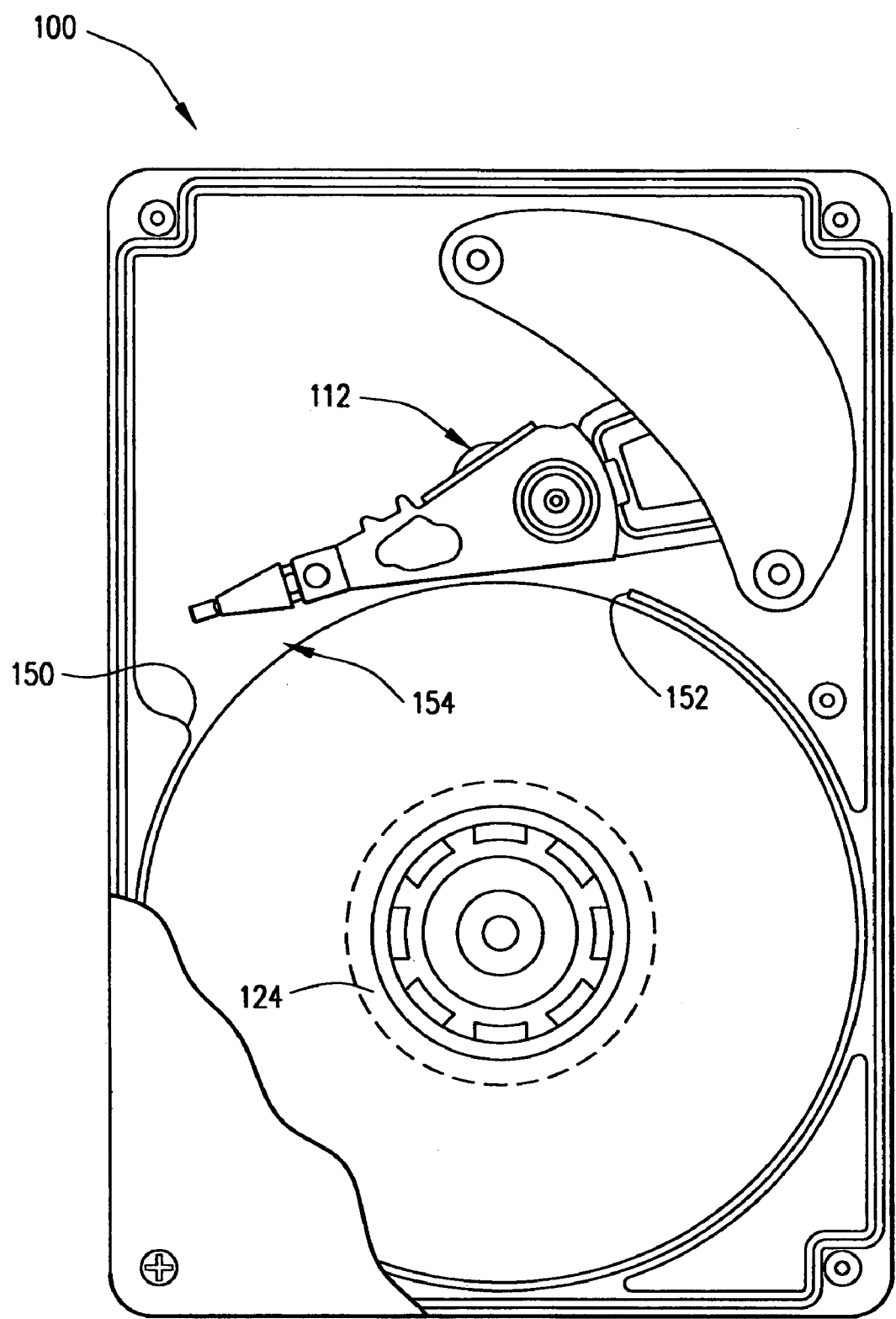

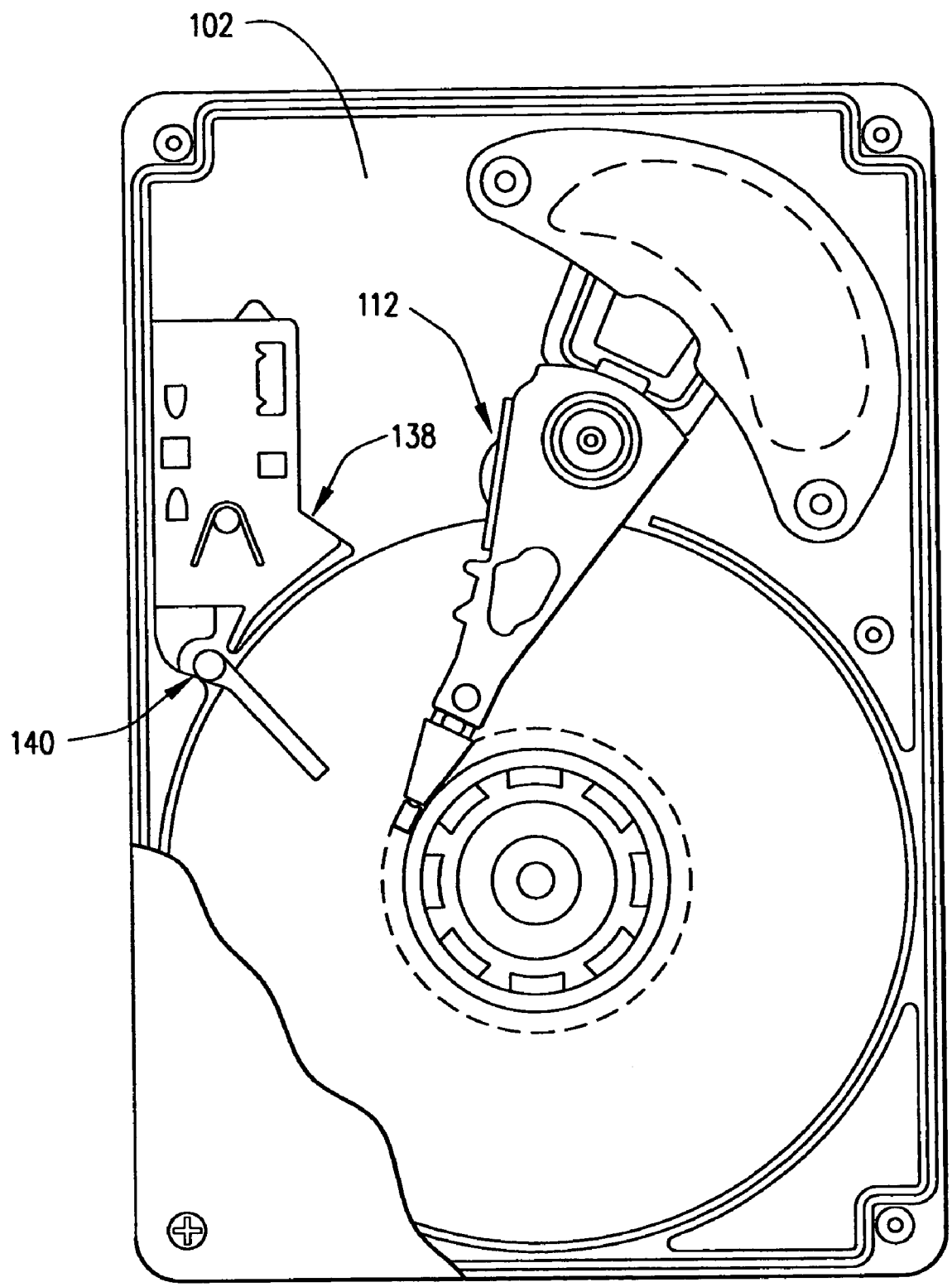

DOWNSTREAM FINNED STRIPPER SHROUD AIRSTREAM CONDITIONING APPARATUS FOR A DISC DRIVE

CROSS REFERENCE TO RELATED APPLICATIONS

This application claims the benefit of U.S. Provisional Application No. 60/220,722 filed Jul. 26, 2000.

FIELD OF THE INVENTION

This invention relates generally to the field of data storage devices, and more particularly but not by way of limitation to controlling the aerodynamic excitation imparted to components by air currents generated by the spinning data storage discs.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance above the data storage surface upon an air bearing generated by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, and data storage densities are continually being increased. The result is an overall increased sensitivity to vibration as a percentage of track width. These vibrations can have an adverse effect on the positioning control systems moving the actuator relative to the spinning discs.

One source of excitation that can no longer be disregarded comes from the air currents moving within the disc stack and impinging on disc drive components. The air current velocity, and hence the associated forces, increase in relation to the radial distance from the axis of rotation. Thus, the air currents move faster and are more likely turbulent at outer portions of the discs. Turbulence can impart adverse vibrations, or aerodynamic excitation, to the discs (flutter) and/or to the actuator, particularly to the suspension members (buffeting). Turbulence can also be created by shedding vortices formed from the actuator wake as the airstream flows past the actuator, and also acting on the disc edges as the air currents are expelled from the disc stack. Further, wake excitation from the actuator increases disc vibration.

It has been determined that airstream excitation can be reduced by an airstream conditioning apparatus comprising an airstream stripper and air dam downstream of the actuator. It is to this improvement that embodiments of the present invention are directed.

SUMMARY OF THE INVENTION

Embodiments of the present invention are directed to providing an airstream conditioning apparatus for a disc drive for attenuating the aerodynamic excitation of air currents on disc drive components. The disc drive typically has an enclosure supporting a rotating data storage disc and an actuator operatively interfacing in a data transfer relationship. In one embodiment of the present invention the airstream conditioning apparatus comprises an airstream stripper supportable downstream of the actuator with respect to the direction of the air currents. The airstream stripper comprises a vane extending substantially radially from an outer radial portion to an inner radial portion of the data storage disc and adjacent the data storage surface. The vane is disposed substantially transverse to the actuator distal end along the radial path of actuator travel across the data storage disc.

In another embodiment of the invention the airstream conditioning apparatus comprises a frame supportable by the enclosure that, in turn, supports the airstream stripper. The frame can further comprise a shroud forming a perimeter surface substantially transverse to the data storage disc outer edge and intersecting the airstream stripper. The shroud can furthermore comprise a fin forming a planar surface extending from the perimeter surface and substantially coextensive with the data storage surface of the data disc.

In another embodiment of the present invention the frame supports the airstream stripper in movement between an operative position and a retracted position. A retaining member retains the airstream stripper in the operative position. A bias member can compressingly engage the enclosure to produce an attachment force on the frame for retention in the enclosure.

These and various other features as well as advantages which characterize the present invention will be apparent upon reading of the following detailed description and review of the associated drawings.

BRIEF DESCRIPTION OF THE DRAWINGS

FIG. 2 is an enlarged detail representation of the airstream stripper of FIG. 1.

FIG. 3 is a view similar to FIG. 2 illustrating an airstream stripper constructed in accordance with an alternative embodiment of the present invention.

FIG. 4 is a partial cross sectional view taken along the line 4—4 in FIG. 1, illustrating the airstream stripper downstream of the read/write heads and interleaved with the discs.

FIG. 6 is an isometric representation of the disc drive of FIG. 1 with the disc and actuator partially cut away to reveal the airstream stripper in the retracted position; the airstream stripper is also shown in the operative position in broken lines.

FIGS. 7 and 8 are simplified plan views of the disc drive of FIG. 1 more particularly illustrating the shroud formed by the base deck.

FIG. 16 is a diagrammatic plan representation of the airstream stripper positively positioned and retained in the operative position.

DETAILED DESCRIPTION

Figure 1:
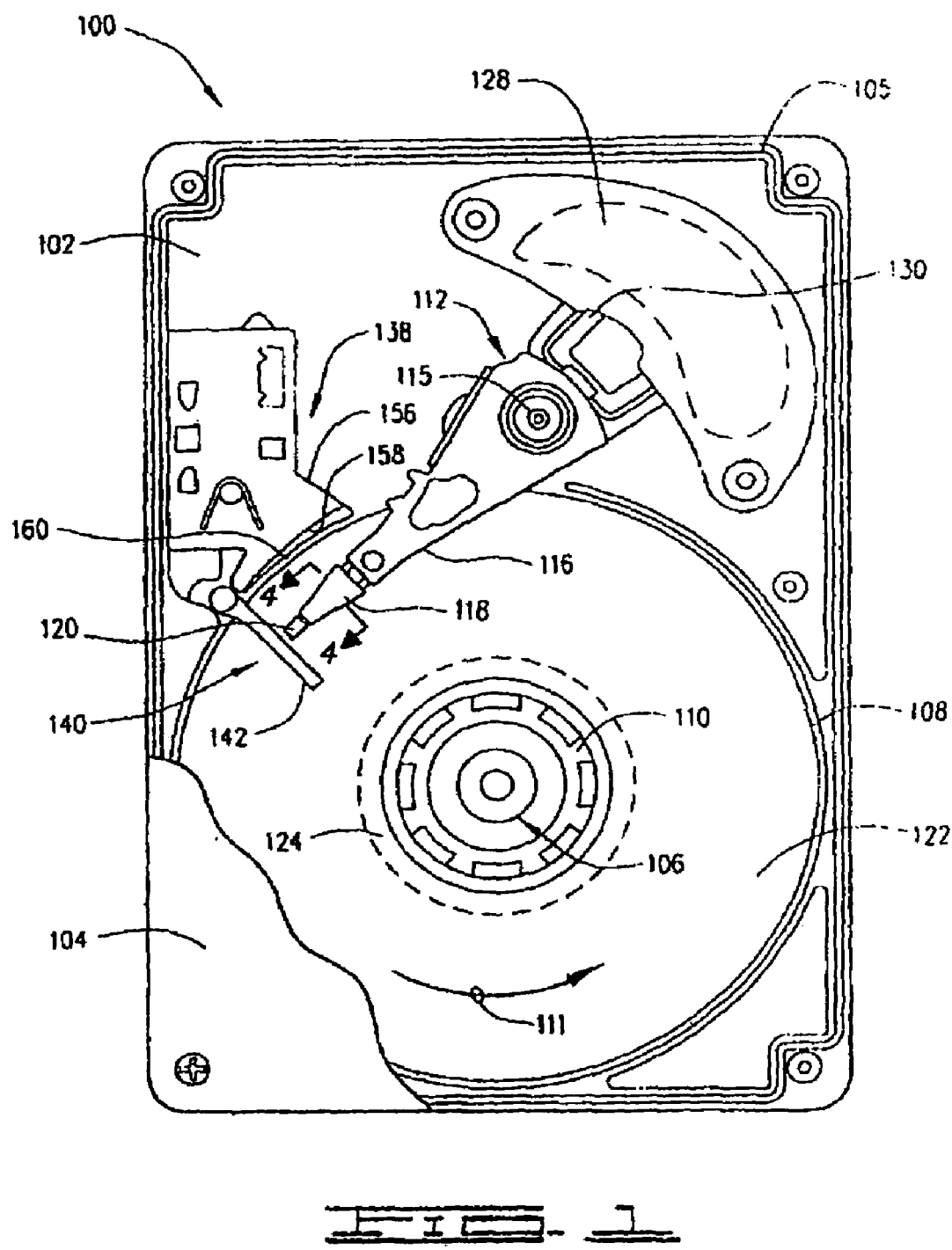
FIG. 1 is a diagrammatic plan representation of a disc drive constructed in accordance with an embodiment of the present invention, having the cover partially cut away.

Referring to the drawings in general, and more particularly to FIG. 1, shown therein is a plan representation of a disc drive 100 constructed in accordance with an embodiment of the present invention. The disc drive 100 includes a base 102 to which various disc drive components are mounted, and a cover 104 (partially cutaway) which together with the base 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer (not shown). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 are flex members that support data transfer members, such as read/write heads 120, with each of the read/write heads 120 operational interfacing a surface of one of the discs 108 in a data reading and writing relationship. This relationship is maintained by a slider (not shown) which operably supports the read/write head 120 on an air bearing sustained by air currents generated by the spinning discs 108.

Each of the discs 108 has a data storage region comprising a data recording surface 122 divided into concentric circular data tracks (not shown). Each of the read/write heads 120 is positioned adjacent a desired data track to read data from or write data to the data track. The data recording surface 122 can be bounded inwardly by a circular landing zone 124 where the read/write heads 120 can come to rest against the respective discs 108 at times when the discs 108 are not spinning. Alternatively, the landing zone can be located elsewhere.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit causing the actuator coil 130 to move. As the actuator coil 130 moves, the actuator 112 pivots around the pivot bearing 115, causing the read/write heads 120 to travel across the discs 108.

As noted earlier, the motor 106 spins the discs 108 at a high speed as the read/write head 120 reads data from and writes data to the data storage surface 122. The kinetic energy of the spinning discs 108 transfers through the boundary layer at the disc/air interface, thereby inducing a rotational force component to air currents, and centrifugal force imparts a radial force component to air currents, creating a generally outwardly spiraling airstream. The air currents gain velocity in moving radially outward because of the relatively faster linear speed of the disc 108 with increased radial distance from the axis of rotation.

An airstream conditioning apparatus 138 comprises an airstream stripper 140 that is supportable downstream of the actuator 112 with respect to the direction of the currents (FIG. 1 reference 111). The airstream stripper 140 comprises a number of vanes 142 (only one shown in FIG. 1) extending substantially radially from an outer radial portion to an inner radial portion of the data disc 108, and thereby disposed adjacent the data storage surface 122 of the disc 108. Where two or more discs 108 are stacked with spacers forming a disc stack, the airstream stripper 140 can comprise a corresponding number of vanes 142 disposed in the spaces between adjacent discs 108 so as to be adjacent to both data storage surfaces 122 of adjacent discs 108.

FIG. 2 is an enlarged detail representation of the airstream stripper 140 of FIG. 1, illustrating the manner in which the vane 142 is operatively disposed substantially transverse to the actuator 112 distal end. More particularly, preferably the vane 142 has a leading edge 144 with a characteristic arcuate shape matching the arcuate radial path of the read/write head 120 across the disc 108. This permits the vane 142 to be substantially constantly spaced downstream of the read/write head 120 for all positions of the actuator 112. Although a fixed separation is preferable, FIG. 3 is a view similar to FIG. 2 illustrating an alternative vane 142 with a substantially linear leading edge 144. In this case, the minimum separation between the vane 142 and the read/write head 120 is preferably at the outermost portion of the data storage surface 122, where the air current velocity is greatest.

FIG. 4 is a cross sectional view taken along the section line 4—4 in FIG. 1, showing the plurality of vanes 142 interleaved with the stacked discs 108 of the disc stack. Each vane 142 is sized to substantially fill the space between adjacent discs 108. Although FIG. 4 illustrates a disc stack comprising two discs 108, it will be understood that a disc stack comprising more or fewer discs 108 can likewise be accommodated by an associated number of vanes 142.

By substantially filling the spaces downstream of the read/write heads 120, the vanes 142 reduce aerodynamic excitation effects of the air currents on the actuator 112. For example, the vanes 142 decrease the Reynolds shear stresses acting on the actuator 112 by decelerating the air current mean flow. Also, the vanes 142 act in the manner of a flow straightener device, substantially like a honeycomb device, to establish fully developed air current flow conditions, thereby suppressing the three-dimensional wake formed downstream of the actuator 112. Furthermore, as the aerodynamic excitation on the actuator 112 is reduced, such as for the reasons above, then the torque disturbances on the desired actuator 112 movement are reduced.

Figure 5:
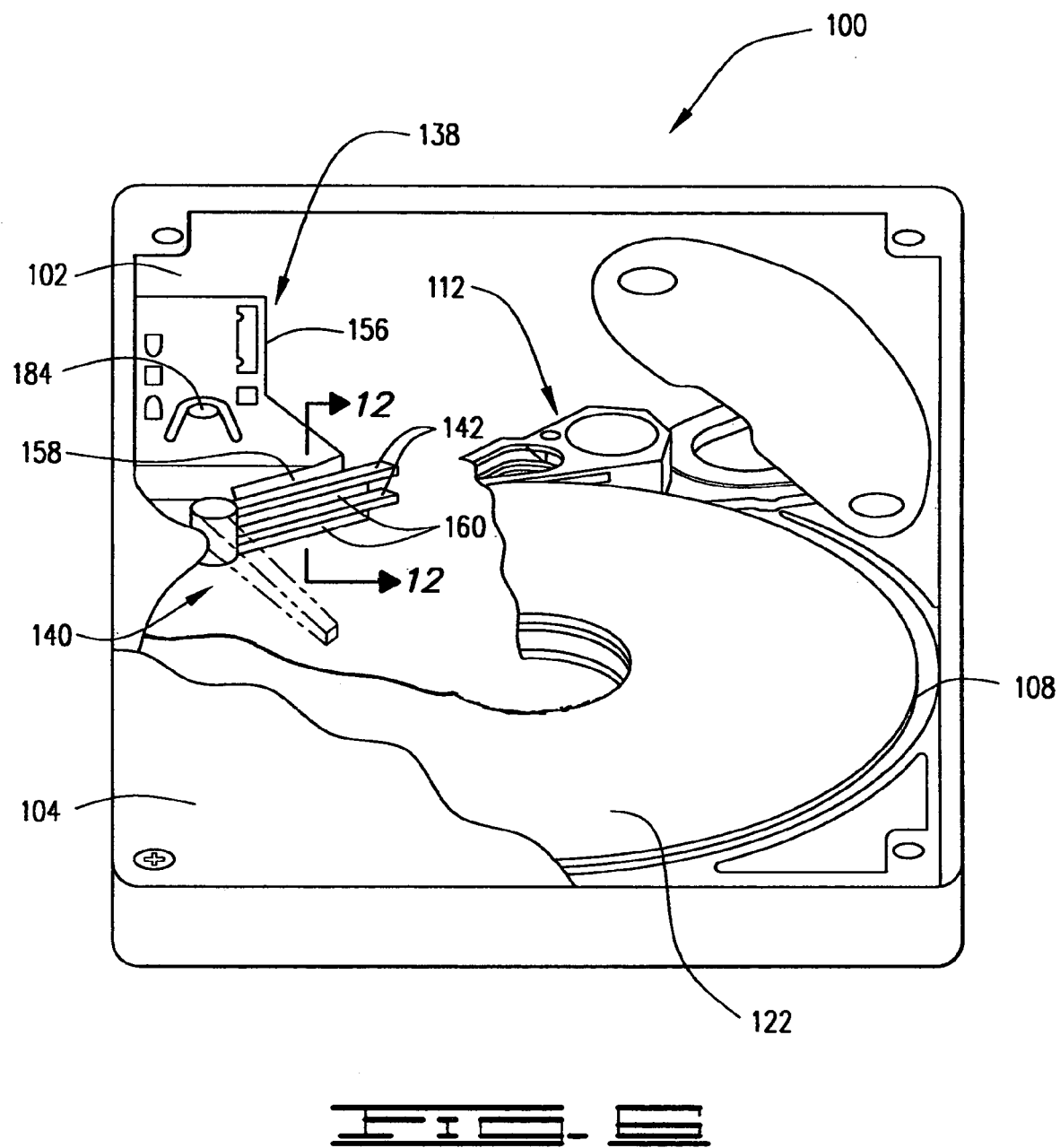
FIG. 5 is an elevational view of the airstream stripper of FIG. 1 rotatably supported by the base deck.

The airstream stripper 140 can be supported generally by the enclosure. For example, FIG. 5 illustrates an elevational view of the airstream stripper 140 of FIG. 1 comprising a shaft 146 from which the plurality of vanes 142 depend. The shaft 146 can be provided with a longitudinal opening that receivingly engages a boss 148 supported by or formed as a portion of the base 102. A tool feature 149 can be provided to receivingly engage an assembly tool for rotating the shaft 146.

This support arrangement, or an equivalent, can also be used to provide a pivotal support of the airstream stripper 140 such that the vanes 142 can be moved between a retracted position (not interleaved with the discs 108) and an operative position (interleaved with the discs 108). FIG. 1 illustrates the operative position of the airstream stripper 140. FIG. 6 is a partially cutaway isometric view of the disc drive 100 of FIG. 1, illustrating the airstream stripper 140 rotated to the retracted position, and illustrating in broken lines the operative position of the airstream stripper 140.

The airstream stripper 140 can be more effective when used in conjunction with a shroud around the disc 108 and downstream of the actuator 112. As used herein, "shroud" means a stationary upstanding surface transverse to the edges of the spinning discs 108. Shrouding the disc stack can reduce aerodynamic excitation sources. Further, shrouding laminarizes the flow and reduces three dimensional effects in the enclosure. Shrouding also minimizes the effects of shedding vortices at disc edges producing axial forces on the disc 108 from the air currents expelled from the disc stack. Shrouding also reduces the resistive drag on the spinning discs 108, thereby minimizing the power necessary to maintain the disc stack at a desired rotational speed.

To minimize part count and simplify manufacturing processes, it can be advantageous to provide a shroud as a portion of the base 102. Ideally, the base 102 would have a characteristic upstanding portion or portions that entirely shroud the periphery of the spinning discs 108. However, an opening is required in the shroud for the actuator 112. The opening is, at a minimum, wide enough to provide clearance for a medial portion of the actuator 112 in moving the read/write heads 120 within the desired limits of travel.

FIGS. 7 and 8 are simplified views of a portion of the disc drive 100 of FIG. 1, illustrating the shroud formed by the base deck 102 that extends circumferentially from a first end 150 to a second end 152, leaving an opening 154 through which the actuator 112 moves. In FIG. 7 the actuator 112 is pivoted to the desired inner travel limit whereat the read/write head 120 can land in the landing zone 124. In FIG. 8 the actuator 112 is pivoted to the desired outer travel limit whereat the actuator 112 and the disc stack are demerged. This permits assembly or replacement of either the actuator 112 or the disc stack while the other remains installed. This also permits the use of read/write head 120 parking devices (not shown), such as off load ramps, that support the read/write heads 120 away from the disc stack for enhanced nonoperational shock protection.

If, as in the disc drive 100 of FIG. 1, the actuator 112 operative outer travel limit is an outermost data track, then the portion of the disc stack downstream of the actuator 112 can be shrouded after the actuator 112 and disc stack are merged. Accordingly, the airstream conditioning apparatus 138 of FIG. 1 comprises an attaching frame portion 156 that supports a shroud portion comprising a perimeter surface 158 disposed substantially transverse to the disc 108 outer edge. The perimeter surface 158 extends from a first end intersecting the vanes 142 of the airstream stripper 140 to a second end to narrow the opening 154 (FIGS. 7 and 8) through which the actuator 112 moves, thereby preferably shrouding the discs 108 as much as possible.

Figure 9:
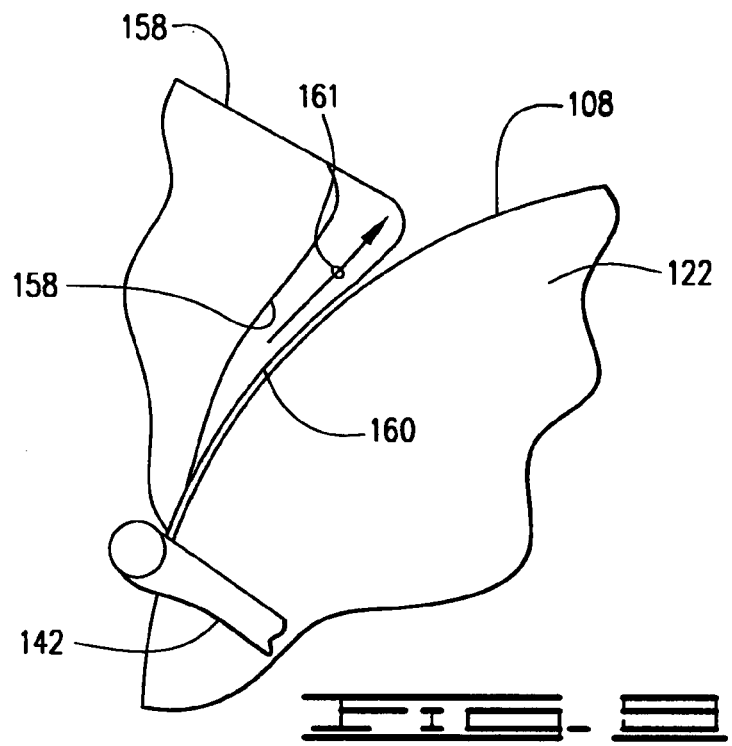
FIG. 9 is an enlarged detail representation of a portion of the airstream conditioning apparatus of the disc drive of FIG. 1.

FIG. 9 is an enlarged detail representation of a portion of the perimeter surface 158 portion of the airstream conditioning apparatus 138. By closely-fitting the perimeter surface 158 to the disc 108 edge at the first end thereof adjacent the airstream stripper 140, substantially no air will be expelled from the disc stack in the area of the read/write head 120. By tapering the perimeter surface 158 away from the disc 108 edge at the second end and therebetween, proportionately more of the airstream will be expelled from the disc stack in the area distantly removed form the read/write head 120. This results in a channeling of air currents expelled from the disc stack in a direction denoted by arrow 161

Figure 10:
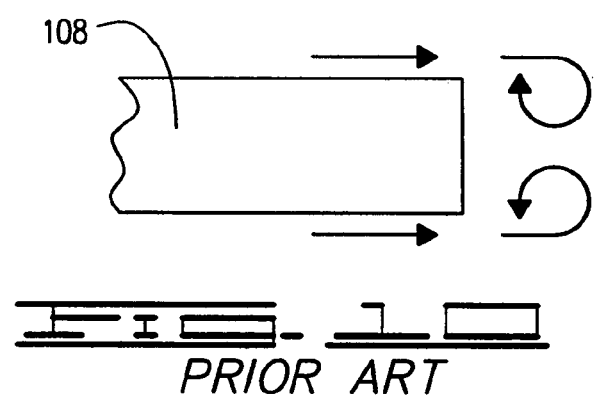
FIG. 10 is a diagrammatic elevational view of a data storage disc illustrating shedding vortices from the expelled air currents acting on the disc edge.
Figure 11:
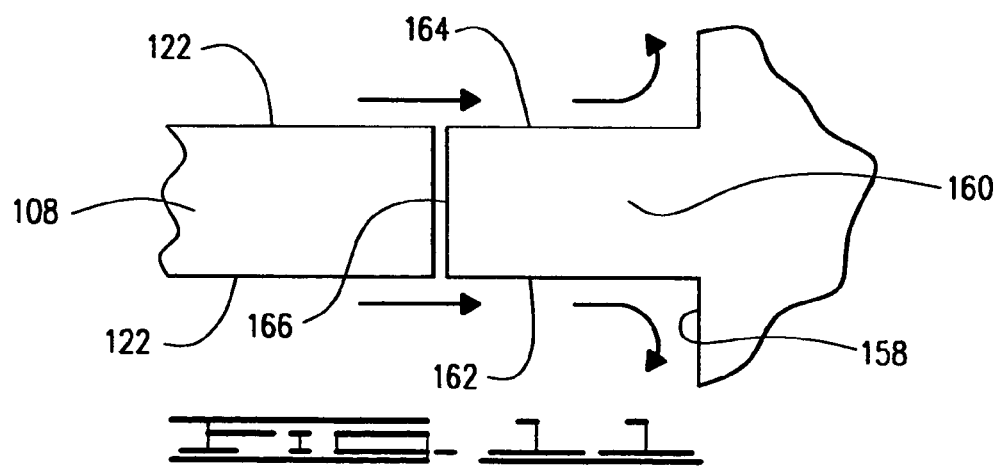
FIG. 11 is a diagrammatic elevational view of a data storage disc and a shroud constructed in accordance with the present invention illustrating shedding vortices from the expelled air currents acting on the disc edge.

But as the gap between the perimeter surface 158 and the disc 108 edge grows, resulting in relatively more air currents being expelled from the disc stack, the greater is the coupling of air currents from adjacent spaces, resulting in turbulence. FIG. 10 illustrates the manner in which the radially expelled air currents form circular eddies of turbulent air currents imparting axial forces on the disc 108 edge. This turbulence is caused by vortices shed from the disc edges. To minimize the effects of shedding vortices, the airstream conditioning apparatus 138 (FIG. 1) can comprises a fin 160 in planar alignment with each of the discs 108. FIG. 11 illustrates the fin 160 comprising opposing planar surfaces 162, 164 substantially coextensively aligned with the data storage surfaces 122 of the respective disc 108. A transverse edge 166 is disposed in a closely fitting relationship to the disc 108 edge. The expelled air currents, as indicated by the reference arrows in FIG. 11, are thus diverted from the disc 108 to reduce the effects of shedding vortices. This reduces the aerodynamic excitation effects of the air currents on the discs 108.

Figure 12:
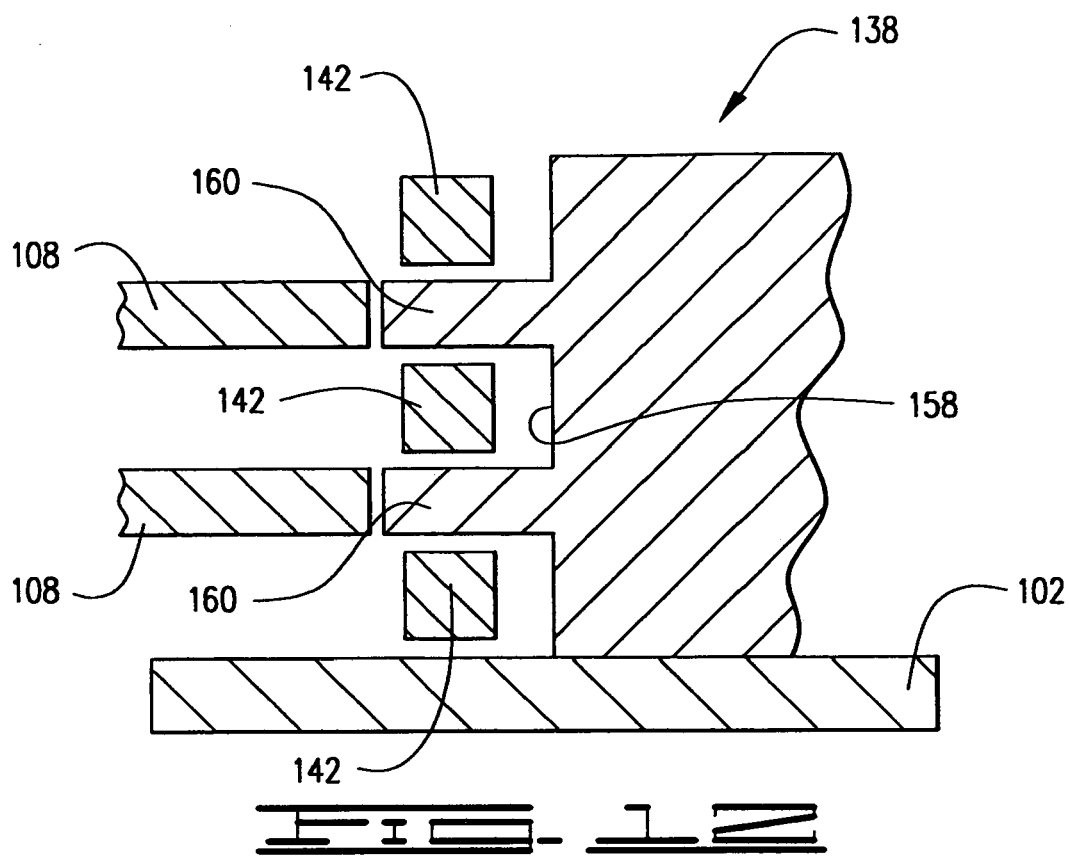
FIG. 12 is a cross sectional view taken along the line 12—12 of FIG. 6 illustrating the airstream stripper in the retracted position.
Figure 15:
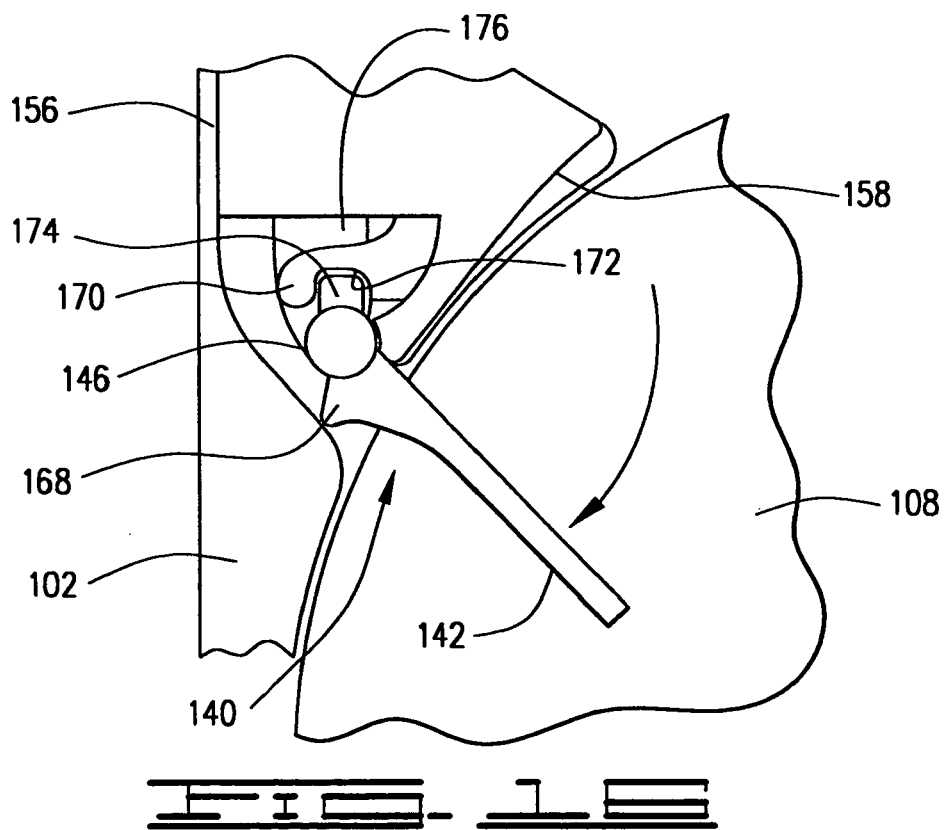
FIGS. 13–15 are diagrammatic representations of an assembly sequence for the disc drive of FIG. 1 wherein the actuator is merged with the disc stack (FIG. 13), the airstream conditioning apparatus is placed to the enclosure with the airstream stripper retracted (FIG. 14), and the airstream stripper is operatively extended and interleaved with the disc stack (FIG. 15).
Figure 13:
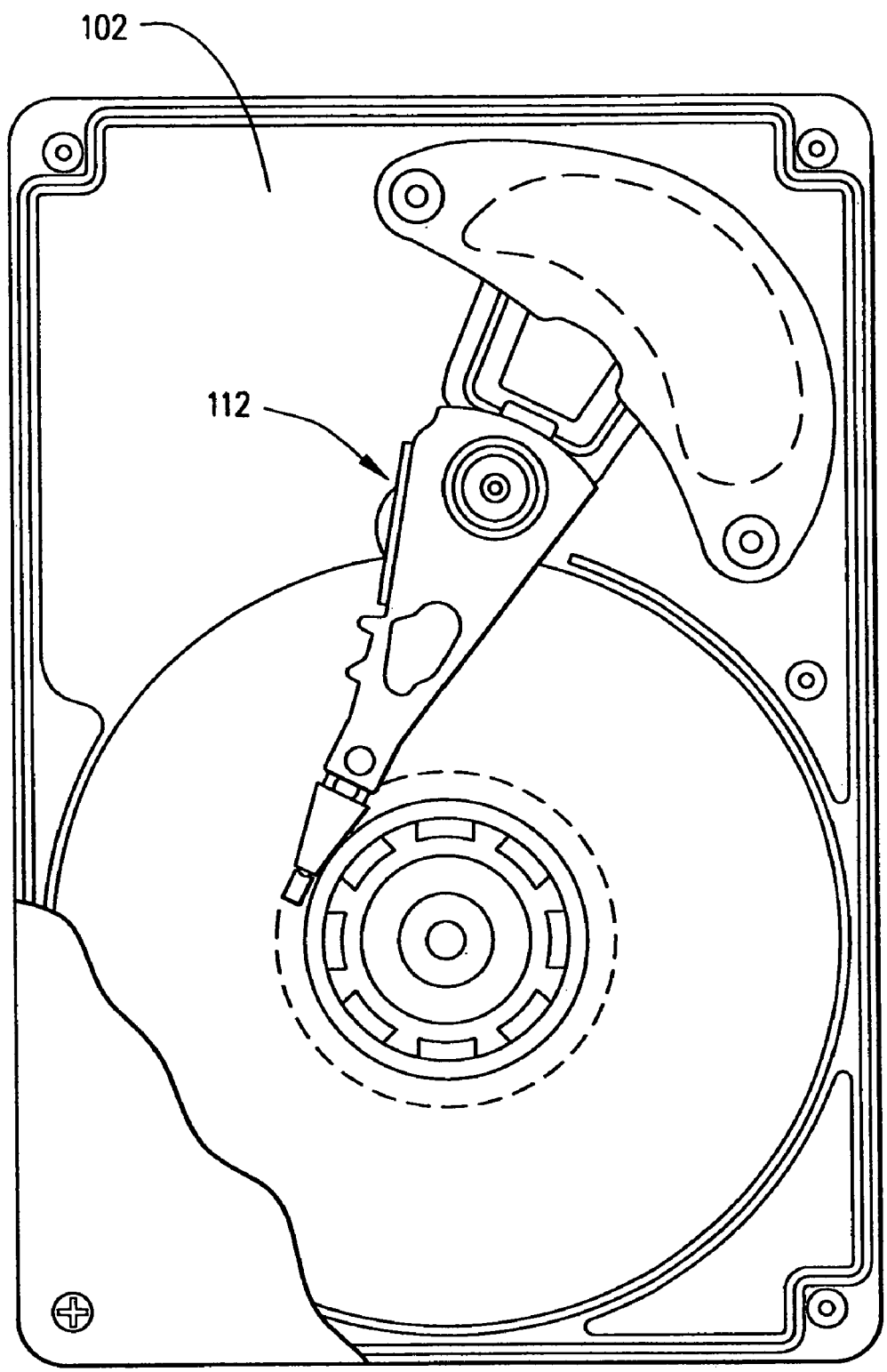
Figure 14:
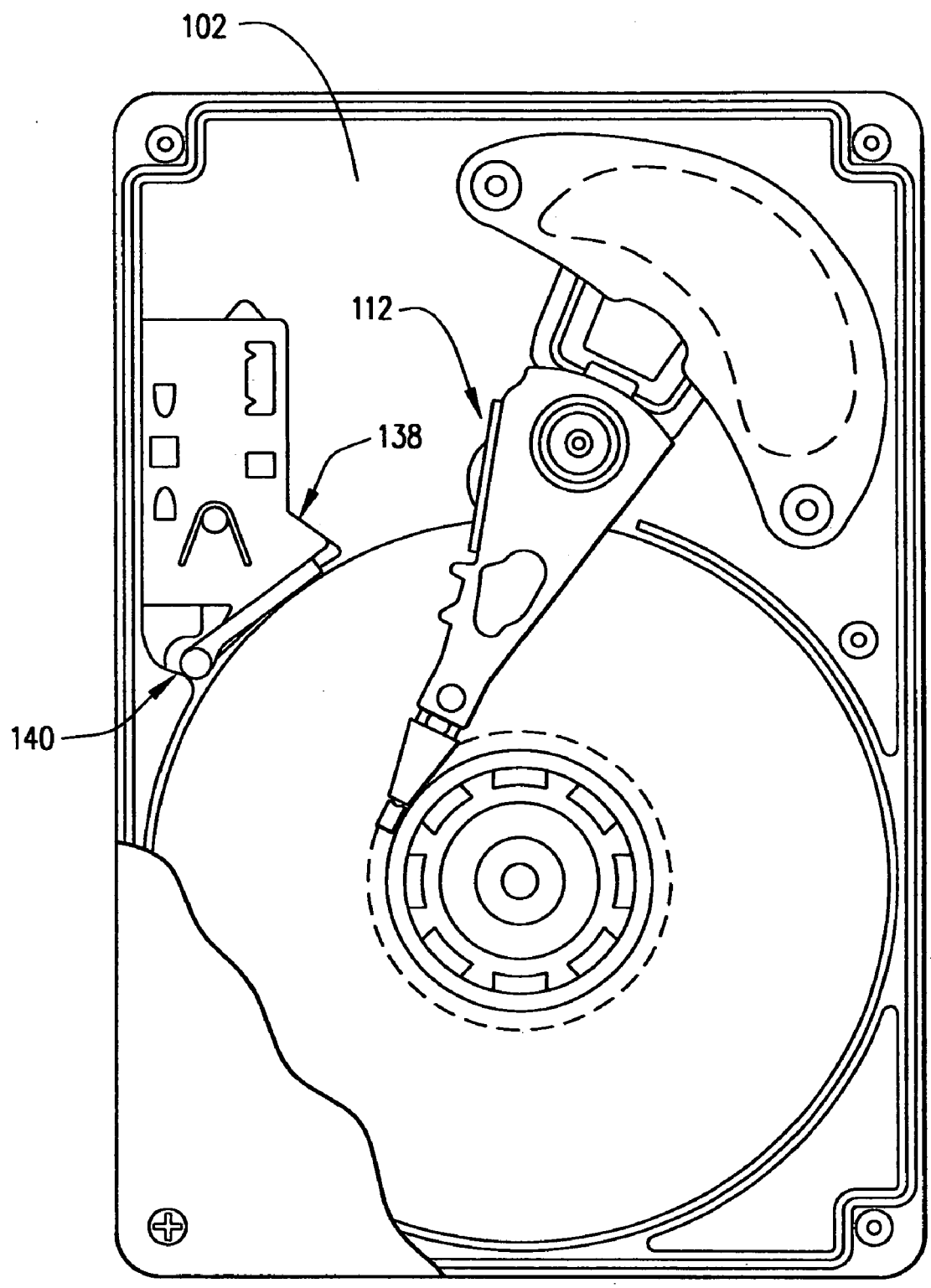

FIG. 12 is a cross sectional view taken along the line 12—12 in FIG. 6, illustrating how the vanes 142 can be interleaved with the fins 160 in the retracted position of the airstream stripper 140. This permits the airstream conditioning apparatus 138 to be installed within the enclosure and then the airstream stripper 140 to be moved to the operative position. FIGS. 13–15 are plan views showing an assembly sequence associated with the retractability feature of the airstream stripper 140. First, the actuator 112 and disc stack are attached to the base 102 and merged (FIG. 13). Alternatively, the actuator 112 and disc stack can be merged and installed together to the base deck 102. Continuing, the airstream conditioning apparatus 138 is then positioned to the base 102 with the airstream stripper 140 in the retracted position (FIG. 14). The airstream stripper 140 is then moved to the operative position (FIG. 15).

A number of design-for-manufacturability features can be provided. For example, features can be provided that generally positively position the airstream stripper 140 in the operative position. FIG. 16 is an enlarged view of the airstream stripper 140, wherein the vane 142 comprises an extending portion 168 that abuttingly engages a selected portion of the base 102 to limit further rotation after reaching the operative position.

Another design-for-manufacturability feature provides for positively retaining the airstream stripper 140 in the operative position. In FIG. 16, for example, the airstream conditioning apparatus 138 comprises an extending spring member 170, which has a detent 172 formed therein. The shaft 146 comprises a tab 174 that is receivingly engaged within the detent 172. Rotation of the airstream stripper toward the operative position causes the tab portion 174 to engage and deflect the spring portion 170. In the operative position the tab 174 is receivingly retained within the detent 172 as the spring portion 170 returns to pressingly engage against the tab 174.

FIG. 16 furthermore illustrates an alternative manner of supporting the airstream stripper 140 in pivotal movement. The attaching frame portion 156 can, for example, comprise an extending support member 176 comprising an opening (not shown) into which the shaft 146 is receivingly retained for rotation therein.

Figure 17:
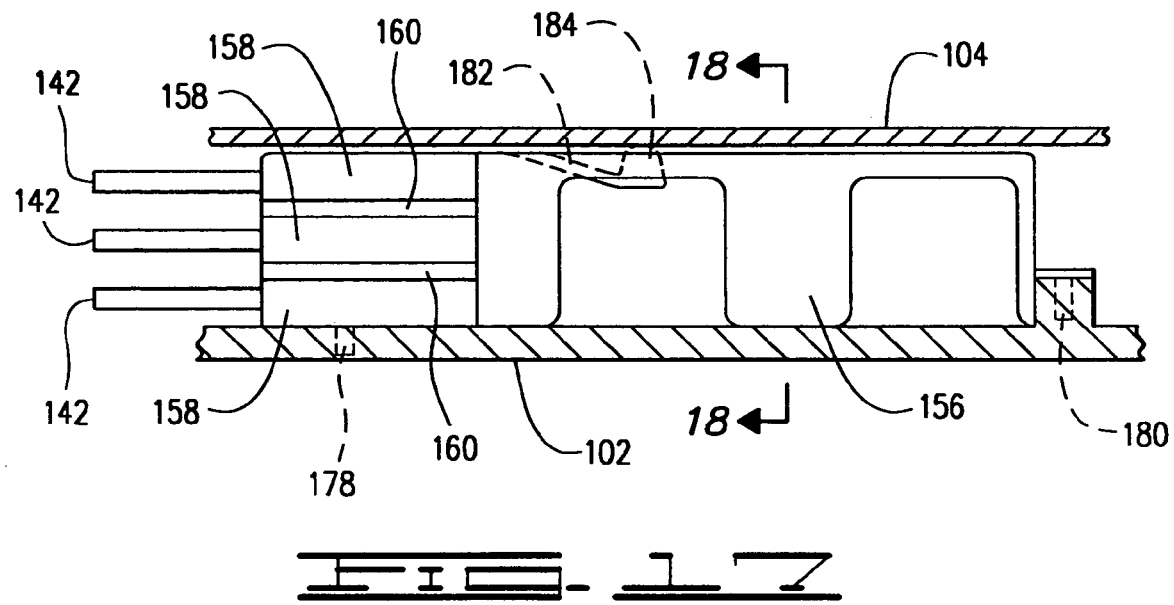
FIG. 17 is an elevational view of the frame portion of the airflow conditioning apparatus of FIG. 1.

Another design-for-manufacturability feature provides for securing the attaching frame 156 portion of the airstream conditioning apparatus 138 in the enclosure without the need for separate fasteners, such as threaded fasteners. FIG. 17 illustrates a partial sectional view of the attaching frame 156 in the manner in which it can be operatively interposed between the base 102 and the cover 104. The attaching frame 156 can be provided with one or more locating tabs 178 at one end thereof, and one or more locating tabs 180 at the other end thereof, which align with corresponding apertures in the base 102 in the operative position of the attaching frame 156. A cantilevered-extending spring member 182 has an enlarged portion 184 that is pressingly engaged by the cover 104 when attached to the base 102. This subjects the spring member 182 to a force that is transferred to the attaching frame 156, thereby urging the attaching frame 156 against the base 102. This cooperation of the spring 182 and tabs 178, 180 provides the necessary attachment force on the attaching frame 156 without the need for separate fasteners.

Figure 18:
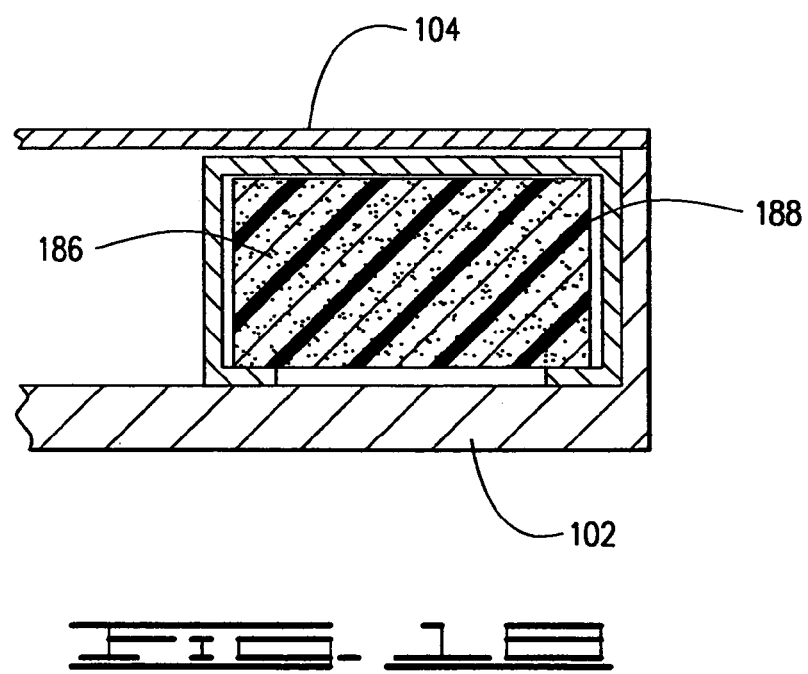
FIG. 18 is a cross sectional view taken along the section line 18—18 in FIG. 17.

FIG. 18 is a cross sectional view taken along the line 18—18 of FIG. 17, illustrating a cavity 186 formed by the attaching frame 156 that can receivingly support a filter cartridge 188.

In one alternative embodiment the vane 142 (FIG. 1) can be extended radially inward from the terminal point shown in FIG. 1, such that the distal end in the operative position extends adjacent the innermost data track, so as to relatively increase the air funneling effect of the airstream conditioning apparatus. In another alternative embodiment the airstream conditioning apparatus can be used in combination with a disc drive having a spindle motor rotation opposite to that shown in FIG. 1, where the airstream conditioning apparatus is effectively upstream of the actuator 112 and more particularly upstream of the read/write head 120.

In summary, an airstream conditioning apparatus is disclosed for a data storage system (such as 100) for attenuating the aerodynamic excitation effects of air currents generated within a data stack of data discs (such as 108) spinning under the control of a motor (such as 106). The data discs spin operatively interfacing with an actuator (such as 112) supporting a read/write assembly (such as 120) in a data reading and writing relationship.

The airstream conditioning apparatus can include an airstream stripper having a downstream vane (such as 140) having a number of vanes (such as 142) associated with each of the number of discs and interposed therebetween adjacent discs. Preferably, the vanes are disposed substantially transverse to the path of the read/write head extending radially across the data disc from an outer radial portion to an inner radial portion of the disc.

The airstream conditioning apparatus can furthermore include a downstream finned shroud (such as 138) that laminarizes the airstream and reduces aerodynamic excitation on the discs and the actuator assembly. The shroud can have a number of fins (such as 160) extending substantially coextensively to the discs and in a closely-fitting edge-to-edge relationship to guide the expelled air currents away from the disc stack without mixing of air currents from the spaces between adjacent discs.

The airstream conditioning apparatus can furthermore include a frame (such as 156) supportable by an enclosure (such as 102) of the data storage system and supporting, in turn, the airstream stripper. The frame can include a shroud (such as 158) defining a perimeter surface substantially transverse to the data storage disc outer edge and the fins, and intersecting the airstream stripper.

The frame can include support means (such as 148, 176) for supporting the airstream stripper in movement between an operative position and a retracted position, and retaining means (such as 170, 174) for operatively retaining the airstream stripper in the operative position.

The frame can include a bias member (such as 182) that is compressingly engageable with the enclosure providing an attachment force on the frame within the enclosure.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and placement of the airstream conditioning apparatus may vary while maintaining substantially the same functionality without departing from the scope and spirit of the present invention. In addition, although the preferred embodiment described herein is directed to a downstream stripper assembly for a disc drive assembly, it will be appreciated by those skilled in the art that the teachings of the present invention can be applied to other systems, like data storage test or certification systems, servo track writers, or optical data storage systems, without departing from the scope and spirit of the present invention.

What is claimed is:

1. An airstream conditioning apparatus for a data storage device for attenuating the aerodynamic excitation of air currents on device components, the data storage device having an enclosure supporting a rotating data storage disc and an actuator operatively interfacing in a data transfer relationship, the apparatus comprising:

an airstream stripper downstream of the actuator with respect to the direction of the air currents produced by the rotating disc and extending adjacent a data storage surface of the disc from an outermost radial portion of the data storage surface to an inner radial portion of the data storage surface and thereby noncontactingly disposed beyond a distal end of the actuator along an actuator path of travel; and a shroud upstream of the airstream stripper defining a perimeter surface substantially transverse to the data storage disc and intersecting the airstream stripper, wherein the shroud comprises a fin defining a planar surface extending from the perimeter surface and substantially coextensive with the data storage disc.

2. The apparatus of claim 1 wherein the data storage device supports a plurality of data storage discs stacked with spacers between adjacent data storage discs and commonly rotated as a disc stack, wherein the airstream stripper extends between adjacent data storage discs.

3. The apparatus of claim 1 wherein airstream stripper extends substantially transverse to the distal end of the actuator.

4. The apparatus of claim 1 wherein the data storage disc comprises opposing planar surfaces, each supporting a data storage surface, and wherein the fin comprises opposing planar surfaces substantially coextensive with the respective data storage surface.

5. The apparatus of claim 1 wherein the fin comprises an edge substantially transverse to the planar surface and closely matingly parallel with the data disc outer edge.

6. The apparatus of claim 1 further comprising a frame supporting the airstream stripper in movement between an operative position and a retracted position.

7. The apparatus of claim 6 wherein the frame comprises a retaining member retaining the airstream stripper in the operative position.

8. The apparatus of claim 1 further comprising a frame with a bias member compressingly engageable with the enclosure providing an attachment force on the frame within the enclosure.

9. The apparatus of claim 1 wherein the perimeter surface is separated from the data storage disc edge a first distance at a first end of the perimeter surface adjacent the airstream stripper, and wherein the perimeter surface is separated from the data disc edge a second distance at a second end of the perimeter surface, the second distance being greater than the first distance.

10. The apparatus of claim 1 wherein the data storage device comprises a disc drive assembly.

11. A disc drive, comprising:
an enclosure;
a disc rotated by a motor;
an actuator having a distal end moving a data transfer element in a data transfer relationship with a data storage surface of the disc; and
an airstream conditioning apparatus supported by the enclosure comprising:
an airstream stripper downstream of the actuator with respect to the direction of air currents generated by the rotating disc and extending adjacent the data storage surface from an outermost radial portion of the data storage surface to an inner radial portion of the data storage surface and thereby noncontactingly disposed beyond the distal end of the actuator along an actuator path of travel; and
a shroud upstream of the airstream stripper defining a perimeter surface substantially transverse to the disc and intersecting the airstream stripper, wherein the shroud comprises a fin defining a planar surface extending from the perimeter surface and substantially coextensive with the disc.

12. The disc drive of claim 11 wherein the airstream stripper extends substantially transverse to the actuator distal end.

13. The disc drive of claim 11 wherein fin extends from the perimeter surface substantially parallel with the disc.

14. A disc drive, comprising:
a base supporting a spinning data storage disc operatively interfacing with an actuator in a data reading and writing relationship; and
means for limiting the aerodynamic excitation resulting from air currents generated by the spinning disc.

* * * * *